United States Patent
Tang et al.

(10) Patent No.: US 9,263,956 B2
(45) Date of Patent: Feb. 16, 2016

(54) SWITCH-MODE POWER SUPPLY CONTROL APPARATUS AND FLYBACK SWITCH-MODE POWER SUPPLY INCLUDING THE CONTROL APPARATUS

(75) Inventors: Xianming Tang, Hangzhou (CN); Yunlong Yao, Hangzhou (CN); Jianxing Wu, Hangzhou (CN)

(73) Assignee: HANGZHOU SILAN MICROELECTRONICS CO., LTD., Hangzhou, Zhejiang Province (TW)

( * ) Notice: Subject to any disclaimer, the term of this patent is extended or adjusted under 35 U.S.C. 154(b) by 245 days.

(21) Appl. No.: 14/123,038

(22) PCT Filed: May 25, 2012

(86) PCT No.: PCT/CN2012/076083
§ 371 (c)(1),
(2), (4) Date: Nov. 29, 2013

(87) PCT Pub. No.: WO2012/163248
PCT Pub. Date: Dec. 6, 2012

(65) Prior Publication Data
US 2014/0092648 A1    Apr. 3, 2014

(30) Foreign Application Priority Data

May 31, 2011  (CN) .......................... 2011 1 0148145

(51) Int. Cl.
*H02M 1/32* (2007.01)
*H02M 3/335* (2006.01)
*H02M 1/00* (2007.01)

(52) U.S. Cl.
CPC ...... *H02M 3/33515* (2013.01); *H02M 3/33538* (2013.01); *H02M 1/32* (2013.01); *H02M 2001/0035* (2013.01); *Y02B 70/16* (2013.01)

(58) Field of Classification Search
CPC  H02M 1/32; H02M 3/33507; H02M 3/33515

USPC ............ 363/21.12, 21.13, 21.16, 21.18, 56.1, 363/97
See application file for complete search history.

(56) References Cited

U.S. PATENT DOCUMENTS

| 4,937,728 A | * | 6/1990 | Leonardi | ........... | H02M 3/33523 363/19 |
| 5,041,956 A | * | 8/1991 | Marinus | ............ | H02M 3/33523 363/21.05 |

(Continued)

FOREIGN PATENT DOCUMENTS

| CN | 1806380 A | 7/2006 |
| CN | 1965463 A | 5/2007 |

(Continued)

*Primary Examiner* — Jeffrey Sterrett
(74) *Attorney, Agent, or Firm* — Birch, Stewart, Kolasch & Birch, LLP

(57) ABSTRACT

A switch-mode power supply control apparatus includes a PWM controller for outputting a driving signal and a short-circuit protection module coupled to a detection terminal. The detection terminal receives a zero-crossing detection voltage. If the time that the detection voltage input to the detection terminal is lower than a first reference voltage exceeds a predetermined time period, the short-circuit protection module determines that a short-circuit abnormal situation occurs, the short-circuit protection module outputs a short-circuit signal to the PWM controller, and the driving signal output by the PWM controller becomes a turn-off signal. If the short-circuit protection module does not detect the short-circuit abnormal situation, the PWM controller operates normally. A flyback switch-mode power supply includes the switch-mode power supply control apparatus. The flyback switch-mode power supply has a low power consumption when a short-circuit protection is taking place.

10 Claims, 3 Drawing Sheets

(56) References Cited

U.S. PATENT DOCUMENTS

| | | | |
|---|---|---|---|
| 5,072,353 A * | 12/1991 | Feldtkeller | H02M 3/335 363/20 |
| 2006/0279266 A1 * | 12/2006 | Currell | H02M 3/156 323/282 |
| 2007/0008749 A1 * | 1/2007 | Baurle | H02M 3/33507 363/21.12 |
| 2008/0259659 A1 | 10/2008 | Choi et al. | |
| 2008/0278973 A1 | 11/2008 | Lin et al. | |
| 2010/0149712 A1 | 6/2010 | Wang et al. | |
| 2010/0320989 A1 * | 12/2010 | Chang | H02M 3/33523 323/285 |
| 2014/0092648 A1 * | 4/2014 | Tang | H02M 3/33515 363/21.17 |

FOREIGN PATENT DOCUMENTS

| | | |
|---|---|---|
| CN | 2924919 Y | 7/2007 |
| CN | 201022180 Y | 2/2008 |
| CN | 101969188 A | 2/2011 |
| CN | 102364859 A | 2/2012 |

* cited by examiner

SWITCH-MODE POWER SUPPLY CONTROL APPARATUS AND FLYBACK SWITCH-MODE POWER SUPPLY INCLUDING THE CONTROL APPARATUS

FIELD OF THE INVENTION

The present invention relates to flyback switch-mode power supplies, and more specifically, to a technology in the field of flyback switch-mode power supplies with short-circuit protection.

BACKGROUND

A switch-mode power supply is a power source which utilizes modern electrical and electronic technology to control the ratio of on-time to off-time for a switch transistor and maintain a stable output voltage. The switch-mode power supply can be categorized into DC-DC converter circuit or AC-DC converter circuit, isolated or non-isolated converter circuit, boost or buck converter circuit, continuous current mode (CCM) or discontinuous current mode (DCM), etc. Among these converter circuits, the isolated converter circuit can further be categorized into single-ended structure (flyback or forward) and double-ended structure (pull-push, half-bridge or full-bridge).

There are about 14 commonly used types of basic topologies for the switch-mode power supply. Each type has its own characteristics and application. The flyback switch-mode power supply is more applicable to a high-voltage and low-power scenario where the voltage is no higher than 5000 V and the power is lower than 15 W. In the case of a relatively high input voltage and an appropriate primary current, the flyback switch-mode power supply may also be applied in a power source whose output power is up to 150 W. A major advantage of the flyback switch-mode power supply is that it does not require an output filtering inductor, which is especially crucial for decreasing the size of the converter and lowering the cost. Moreover, the flyback switch-mode power supply does not require a high-voltage freewheeling diode, either, which is more advantageous in a high-voltage application.

With respect to the topology of the flyback switch-mode power supply, when the switch transistor turns on, the transformer stores energy and the load current is provided by an output filtering capacitor. When the switch transistor turns off, the transformer delivers the stored energy to the load and the output filtering capacitor in order to compensate the energy consumed when the capacitor alone provides current to the load.

FIG. 1 illustrates a basic topology of a flyback switch-mode power supply. The flyback switch-mode power supply 100 includes a flyback converter and a PWM controller 101. The flyback converter includes a transformer 102, a switch transistor S1, an output rectifier D1 and an output filtering capacitor C1. The type of the converter can be recognized easily as the flyback converter through the in-phase terminals of the primary winding L1 and the secondary winding L2 of the transformer.

An input AC voltage VIN is coupled to the in-phase terminal of the primary winding L1 of the transformer. The anti-phase terminal of the primary winding L1 is coupled to the drain of the switch transistor S1. The gate of the switch transistor S1 is coupled to the PWM controller. The source of the switch transistor S1 is grounded. The in-phase terminal of the secondary winding L2 is grounded. The anti-phase terminal of the secondary winding L2 is coupled to the positive terminal of the output rectifier D1. The negative terminal of the output rectifier D1 and the output filtering capacitor C1 are coupled to an output stage VOUT. The other terminal of the output filtering capacitor C1 is grounded.

When the switch transistor S1 turns on, the input AC voltage VIN supplies energy to the transformer via the primary winding L1 of the transformer and the switch transistor S1, the voltage at the anti-phase terminal of the secondary winding L2 is lower than the voltage at the in-phase terminal, the voltage of the output rectifier D1 is inverted and the output filtering capacitor C1 alone provides power to the load. When the switch transistor S1 turns off, the current flowing through the magnetizing inductor of the transformer makes the voltage of the secondary winding L2 inverted and the output rectifier D1 is forwardly biased. The transformer delivers the stored energy to the load and the output filtering capacitor C1. In order to stabilize the output stage VOUT, the PWM controller controls the ratio of on-time to off-time of the switch transistor S1 based on a feedback voltage from the output stage VOUT.

In order to supply power to the PWM controller, the flyback converter may further includes an auxiliary winding L3, a diode D2 and a capacitor C2. The in-phase terminal of the auxiliary winding L3 is grounded. The anti-phase terminal of the auxiliary winding L3 is coupled to the positive terminal of the diode D2. The negative terminal of the diode D2 and the capacitor C2 are coupled to the power supply terminal VCC of the PWM controller chip. The other terminal of the capacitor C2 is grounded.

When the switch transistor S1 turns on, the voltage at the anti-phase terminal of the auxiliary winding L3 is lower than the voltage at the in-phase terminal, the voltage of the diode D2 is inverted and the capacitor C2 alone supplies power to the PWM controller. When the switch transistor S1 turns off, the current flowing through the magnetizing inductor makes the voltage of the auxiliary winding L2 inverted, the diode D2 is forwardly biased, and the auxiliary winding L3 supplies power to both the PWM controller and the capacitor C2.

When the abnormal situation occurs where the output stage of the flyback switch-mode power supply is shorted, the current flowing through the secondary winding L2 increases sharply, which consumes a majority of the energy supplied by the primary side of the transformer, and the output voltage decreases so that feedback voltage decreases and thus the output of the PWM controller reaches a full duty cycle. At the meantime, the voltage at the anti-phase terminal of the auxiliary winding L3 becomes too low to supply power to the PWM controller and the capacitor C2. As a result, the power supply voltage VCC of the PWM controller decreases. When VCC decreases to a preset voltage, the PWM controller turns off, the power supply voltage VCC begins to increase to enter a restart stage thereby realizing the so called Hiccup protection.

FIG. 2 illustrates a waveform of the power supply terminal VCC and the drive terminal GD of the PWM controller chip when the abnormal situation where the output stage of the flyback switch-mode power supply is shorted occurs. However, the time for entering short-circuit protection is determined by the capacitor C2 and the power of the PWM controller. If the capacitance of the capacitor C2 is too large, it will take a long time to enter short-circuit protection and the current will be large when the system is shorted, also, the transformer will be saturated and the power transistor will be burned down thus damaging the circuit. If the capacitance of the capacitor C2 is too small, the time will be shortened, but the PWM controller may not be able to work normally. Therefore, it is difficult to test the performance of the short-circuit protection, and the uniformity of the batch production will be poor.

SUMMARY

In order to overcome the deficiency of the prior arts, a switch-mode power supply control apparatus and a flyback switch-mode power supply comprising the control apparatus are provided.

The switch-mode power supply control apparatus includes a PWM controller and a short-circuit protection module.

The PWM controller is configured to output a driving signal.

The short-circuit protection module is coupled to a detection terminal which receives a zero-crossing detection voltage, if the time that the detection voltage input to the detection terminal is lower than a first reference voltage exceeds a predetermined time period, the short-circuit protection module determines that a short-circuit abnormal situation occurs, the short-circuit protection module outputs a short-circuit signal to the PWM controller, and the driving signal output by the PWM controller becomes a turn-off signal; if the short-circuit protection module does not detects the short-circuit abnormal situation, the PWM controller operates normally.

Further, the short-circuit protection module includes a detection module and a timer module.

An input terminal of the detection module is coupled to the detection terminal, and the detection module compares the detection voltage inputting to the detection terminal with the first reference voltage, when the detection voltage at the detection terminal is higher than the first reference voltage, the detection module outputs a high voltage; when the detection voltage at the detection terminal is not higher than the first reference voltage, the detection module outputs a low voltage.

An input terminal of the timer module is coupled to an output terminal of the detection module, and an output terminal of the timer module is coupled to the PWM controller; when the detection module outputs a low voltage and the duration of the low voltage exceeds a time period predetermined by the timer module, the timer module outputs the a short-circuit signal to the PWM controller.

The detection voltage input to the detection terminal comes from a voltage at an anti-phase terminal of an auxiliary winding of a flyback switch-mode power supply controlled by the switch-mode power supply control apparatus.

The driving signal is provided to the switch transistor in the flyback switch-mode power supply controlled by the switch-mode power supply control apparatus in order to control on and off of the switch transistor.

The flyback switch-mode power supply includes a flyback converter and a switch-mode power supply control apparatus.

The flyback converter is configured to convert an input AC voltage to an output DC voltage, wherein the flyback converter includes a flyback transformer, a switch transistor, an output rectifier, an output filtering capacitor, an auxiliary winding, a diode and a second capacitor.

The switch-mode power supply control apparatus includes a PWM controller and a short-circuit protection module.

The PWM controller outputs a driving signal which is provided to the switch transistor to control on and off of the switch transistor, wherein the PWM controller determines the ratio of on-time to off-time of the switch transistor.

The short-circuit protection module is coupled to a detection terminal, and a detection voltage input to the detection terminal comes from a voltage at an anti-phase terminal of the auxiliary winding; if the time that the detection voltage at the detection terminal is lower than a first reference voltage exceeds a predetermined time period, the short-circuit protection module determines that an abnormal situation where the flyback switch-mode power supply is shorted has occurred, the short-circuit protection module outputs a short-circuit signal to the PWM controller, and the driving signal output by the PWM controller becomes a turn-off signal; if the short-circuit protection module does not detect the short-circuit abnormal situation, the PWM controller operates normally.

Further, the short-circuit protection module includes a detection module and a timer module.

An input terminal of the detection module is coupled to the detection terminal, and the detection module compares the detection voltage input to the detection terminal to the first reference voltage; when the detection voltage at the detection terminal is higher than the first reference voltage, the detection module outputs a high voltage; when the detection voltage at the detection terminal is not higher than the first reference voltage, the detection module outputs a low voltage.

An input terminal of the timer module is coupled to an output terminal of the detection module, and an output terminal of the timer module is coupled to the PWM controller; when the detection module outputs a low voltage and the duration of the low voltage exceeds a time period predetermined by the timer module, the timer module outputs the short-circuit signal to the PWM controller.

The present invention has the following advantages. Compared with the background art, in the case where the switch-mode power supply control apparatus provided by the present invention is applied in the flyback switch-mode power supply, since the flyback switch-mode power supply has a short-circuit protection function, the flyback switch-mode power supply has a very low power consumption in a short-circuit protection status. The transformer in the flyback switch-mode power supply will not be saturated which may otherwise damage the switch transistor in the flyback switch-mode power supply. Further, the performance of the short-circuit protection will no longer be affected by the second capacitor C2 and the power of the switch-mode power supply, which facilitates testing and the uniformity of the batch production.

DETAILED DESCRIPTION

Illustrations are made to the present disclosure in connection with the accompanying drawings.

Figure 1:
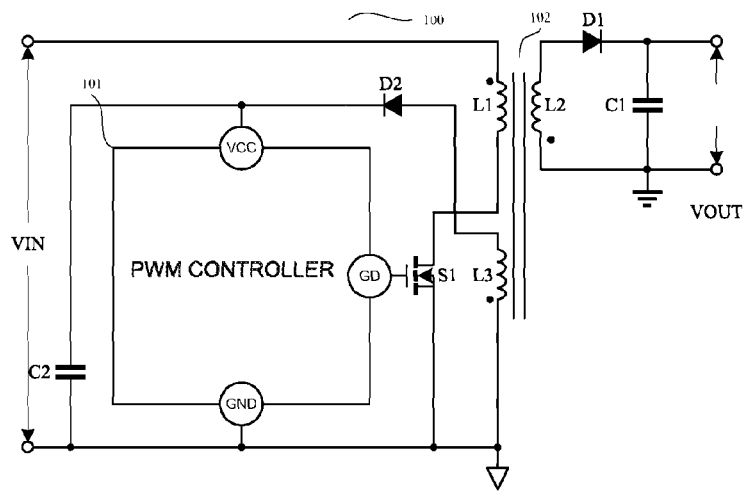
FIG. 1 illustrates a topology of a conventional flyback switch-mode power supply.
Figure 2:
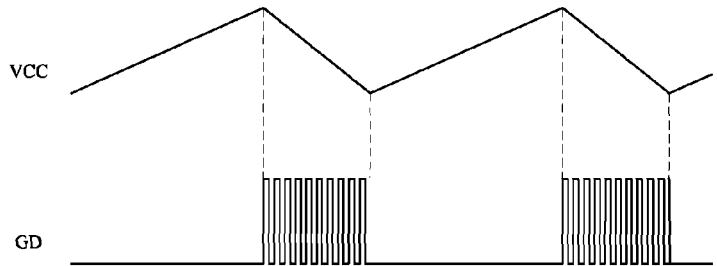
FIG. 2 illustrates a waveform of a conventional flyback switch-mode power supply when being shorted.
Figure 3:
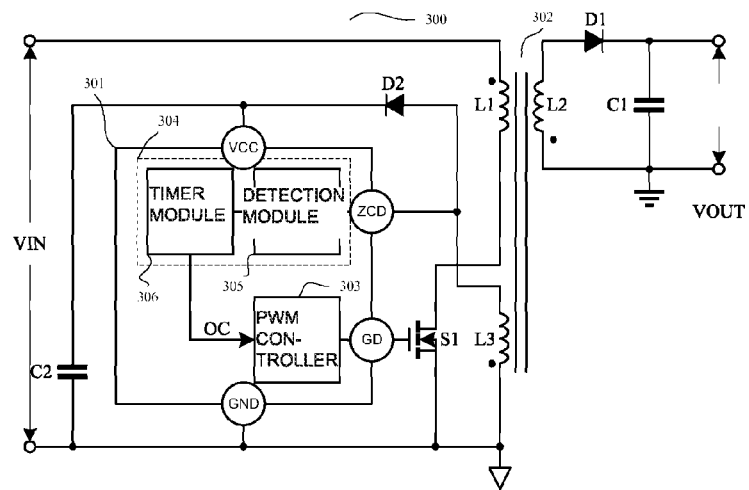
FIG. 3 illustrates a topology of a flyback switch-mode power supply according to the present invention.

FIG. 3 illustrates a topology of a flyback switch-mode power supply having a short-circuit protection circuit according to the present invention. As shown in FIG. 3, the flyback switch-mode power supply includes a flyback converter 302 and a switch-mode power supply control apparatus 301.

The flyback converter 302 converts an input AC voltage to an output DC voltage. The flyback converter 302 includes a flyback transformer, a switch transistor S1, an output rectifier D1, an output filtering capacitor C1, an auxiliary winding L3 of the flyback transformer, a diode D2 and a second capacitor C2. The input AC voltage VIN is coupled to an in-phase terminal of the primary winding L1 of the flyback transformer. An anti-phase terminal of the primary winding L1 is coupled to the drain of the switch transistor S1. The source of the switch transistor S1 is grounded. An in-phase terminal of the secondary winding L2 is grounded. An anti-phase terminal of the secondary winding L2 is coupled to a positive terminal of the output rectifier D1. A negative terminal of the output rectifier D1 is coupled to a terminal of the output filtering capacitor C1. The other terminal of the output filtering capacitor C1 is grounded. The two terminals of the output filtering capacitor C1 are treated as the output stage VOUT. The in-phase terminal of the auxiliary winding L3 is grounded. The anti-phase terminal of the auxiliary winding L3 is coupled to a positive terminal of the diode D2. A negative terminal of the diode D2 and a terminal of the second capacitor C2 are coupled to the power supply terminal VCC. The other terminal of the second capacitor C2 is grounded.

When the switch transistor S1 turns on, the input AC voltage VIN supplies energy to the flyback transformer via the primary winding L1 and the switch transistor S1, the voltage at the anti-phase terminal of the secondary winding L2 is lower than the voltage at the in-phase terminal, the voltage of the output rectifier D1 is inverted and the output filtering capacitor C1 alone supplies power to the load. When the switch transistor S1 turns off; the current flowing through the magnetizing inductor of the flyback transformer makes the voltage of the secondary winding L2 inverted, the output rectifier D1 is forwardly biased, and the flyback transformer delivers the stored energy to the load and the output filtering capacitor C1.

In order to supply power to the PWM controller 301, the flyback converter may further include an auxiliary winding L3, a diode D2 and a capacitor C2. The in-phase terminal of the auxiliary winding L3 is grounded. The anti-phase terminal of the auxiliary winding L3 is coupled to a positive terminal of the diode D2. The negative terminal of the diode D2 and the capacitor C2 are coupled to the power supply terminal VCC of the switch-mode power supply control apparatus. The other terminal of the capacitor C2 is grounded.

When the switch transistor S1 turns on, the voltage at the anti-phase terminal of the auxiliary winding L3 is lower than the voltage at the in-phase terminal, the voltage of the diode D2 is inverted and the capacitor C2 alone supplies power to the switch-mode power supply control apparatus. When the switch transistor S1 turns off, the current flowing through the magnetizing inductor makes the voltage of the auxiliary winding L3 inverted, the diode D2 is forwardly biased and the auxiliary winding L3 supplies power to both the switch-mode power supply control apparatus and the capacitor C2.

The switch-mode power supply control apparatus 301 may include a PWM controller 303 and a short-circuit protection module 304.

In order to stabilize the output voltage VOUT, the PWM controller 303 controls the ratio of on-time to off-time of the switch transistor S1 based on a feedback voltage from the output stage VOUT.

The short-circuit protection module 304 detects the voltage at the anti-phase terminal of the auxiliary winding L3. If the time period when the voltage at the anti-phase terminal of the auxiliary winding L3 is lower than a first reference voltage exceeds a predetermined time period, the short-circuit protection module 304 determines that an abnormal situation where the flyback switch-mode power supply is shorted has already occurred. At the same time, the short-circuit protection module 304 outputs a short-circuit signal to the PWM controller. The PWM controller 303 turns off the switch transistor.

Further, the short-circuit protection module 304 includes a detection module 305 and a timer module 306.

An input terminal of the detection module 305 is coupled to an anti-phase terminal of the auxiliary winding L3 via a detection terminal ZCD. The detection module compares the voltage at the anti-phase terminal of the auxiliary winding L3 with the first reference voltage. When the voltage at the anti-phase terminal of the auxiliary winding L3 is higher than the first reference voltage, the detection module outputs a high voltage. When the voltage at the anti-phase terminal of the auxiliary winding L3 is lower than the first reference voltage, the detection module outputs a low voltage.

An input terminal of the timer module 306 is coupled to an output terminal of the detection module 305. An output terminal of the timer module is coupled to the PWM controller 303. When the detection module outputs a low voltage and the duration of the low voltage exceeds a time period predetermined by the timer module, the timer module outputs a short-circuit signal to the PWM controller to turn off the switch transistor. If the short-circuit detection module does not detect a short-circuit abnormal situation, the PWM controller 303 works normally.

With the utilization of the short-circuit protection module, the time period that the system enters the short-circuit protection status is determined by the timer module. In order to distinguish the normal startup process from the short-circuit situation, the timer module sets a time period. Within this time period, it is regarded as a normal startup process. Beyond this time period, it is regarded as in a short-circuit status. The time period that the system enters the short-circuit protection status is no longer determined by the capacitor C2 or the power of the switch-mode power supply control apparatus. Consequently, the performance of the short-circuit protection will no longer be affected by the capacitor C2 or the power of the switch-mode power supply, which facilitates testing and the uniformity of the batch production.

With the short-circuit protection circuit, the system may have a very low power consumption when the short-circuit protection takes place. Also, the transformer will not be saturated which may otherwise lead to the damage of the switch transistor.

Figure 4:
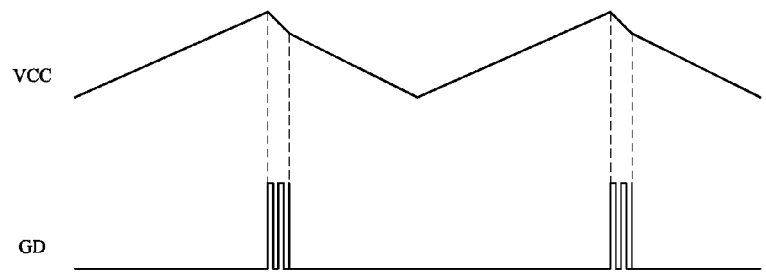
FIG. 4 illustrates a waveform of a flyback switch-mode power supply when being shorted according to the present invention.

FIG. 4 illustrates the waveform of the power supply terminal VCC and the drive terminal GD of the switch-mode power supply control apparatus 301 when an abnormal situation where the output stage of the flyback switch-mode power supply having the short-circuit protection circuit is shorted occurs.

Figure 5:
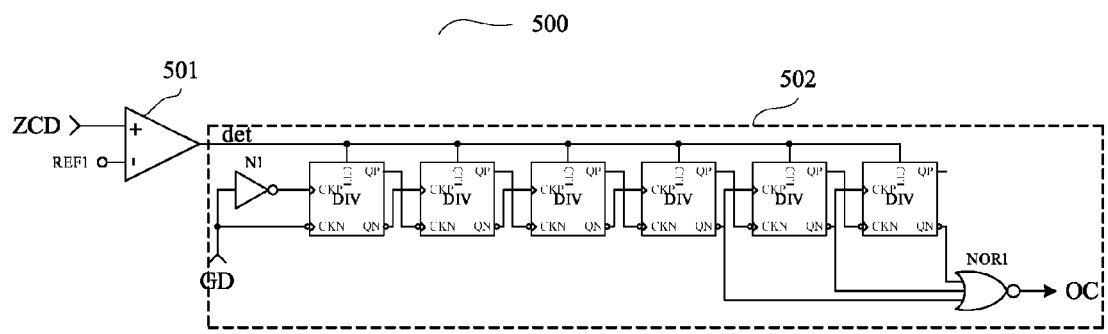
FIG. 5 illustrates a schematic of short-circuit protection module of a flyback switch-mode power supply according to one embodiment of the present invention.

FIG. 5 illustrates a short-circuit protection module 304 according to a first embodiment of the present invention. The short-circuit protection module 304 includes a detection module 501 and a timer module 502.

The detection module 501 includes a comparator 501. The non-inverting input terminal of the comparator 501 is coupled to the anti-phase terminal of the auxiliary winding L3. The inverting input terminal of the comparator 501 is fed with a first reference voltage. When the voltage at the non-inverting input terminal of the comparator 501 is higher than the voltage at the inverting input terminal, the output "det" of the comparator 501 is "1". When the voltage at the non-inverting input terminal of the comparator 501 is lower than the voltage at the inverting input terminal, the output "det" of the comparator 501 is "0".

The timer module 502 is a group of counters. As an example, the group of counters includes six frequency dividers DIV, an inverter N1, and a three-input NOR gate NOR1. An output terminal QP of a first frequency divider DIV is coupled to an input terminal CKN of a second frequency divider DIV. An output terminal QN of the first frequency divider DIV is coupled to an input terminal CKP of the second frequency divider DIV. An output terminal QP of the second frequency divider DIV is coupled to an input terminal CKN of a third frequency divider DIV. An output terminal QN of the second frequency divider DIV is coupled to the input terminal CKP of the third frequency divider DIV . . . and so on and so forth. The number of the frequency dividers can be arbitrarily added. The output driving signal GD of the PWM controller, which is also referred to as the driving signal, acts as a gate driving signal for the switch transistor S1. The driving signal GD is coupled to the input terminal CKN of the first frequency divider DIV and the input terminal of the inverter N1. The output terminal of the inverter N1 is coupled to the input terminal CKP of the first driver DIV. An output terminal QN of a fourth frequency divider DIV, an output terminal QN of a fifth frequency divider DIV and an output terminal QN of a sixth frequency divider DIV are coupled to input terminals of the three-input NOR gate NOR1. The three-input NOR gate NOR1 outputs the short-circuit signal OC.

The output "det" of the comparator 501 is coupled to the control terminals CTL of all the frequency dividers DIV. When the output "det" of the comparator 501 is "1", none of the frequency dividers work and none of the counters count. The three inputs of the three-input NOR gate NOR1 are all "1", and thus the output short-circuit signal OC is "0". When the output "det" of the comparator 501 is "0", the counter starts to count. After 56 switching periods of the driving signal GD and the three inputs of the three-input NOR gate NOR1 are all "0" at the same time, the output short-circuit signal OC turns from "0" to "1".

Figure 6:
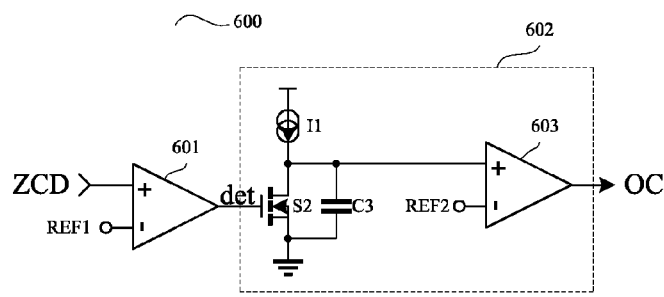
FIG. 6 illustrates a schematic of a short-circuit protection module of a flyback switch-mode power supply according to another embodiment of the present invention.

FIG. 6 illustrates a short-circuit protection module 304 according to a second embodiment. The short-circuit protection module 304 includes a detection module 601 and a timer module.

The detection module 601 is a second comparator 601. The non-inverting input terminal of the second comparator 601 is coupled to the anti-phase terminal of the auxiliary winding L3. The inverting input terminal of the second comparator 601 is fed with a first reference voltage. When the voltage at the non-inverting input terminal of the second comparator 601 is higher than the voltage at the inverting input terminal, the output "det" of second comparator 601 is "1". When the non-inverting input terminal of the second comparator 601 is lower than the voltage at the inverting input terminal, the output "det" of second comparator 601 is "0".

The timer module may include a first current source I1, a second switch transistor S2, a third capacitor C3 and a third comparator 603. The first constant current source I1 and the drain of the second switch transistor S2 are coupled to the non-inverting input terminal of the third comparator 603. The other terminal of the constant current source I1 is coupled to the power supply terminal VCC. The source of the second switch transistor S2 is grounded. The non-inverting input terminal of the third comparator 603 is coupled to the third capacitor C3. The other terminal of the third capacitor C3 is grounded. The non-inverting input terminal of the third comparator 603 is fed with a second reference voltage. The third comparator 603 outputs a short-circuit signal OC.

The second comparator 601 is coupled to the gate of the second switch transistor S2. When the output "det" of the second comparator 601 is "1", the second switch transistor S2 turns on, the voltage at the non-inverting input terminal of the third comparator 603 is 0V, which is lower than the second reference voltage at the inverting input terminal. The short-circuit signal OC output by the third comparator 603 is "0". When the output of the second comparator 601 is "1", the second switch transistor S2 turns off, the first constant current source I1 starts to charge the third capacitor C3, and the voltage at the non-inverting input terminal of the third comparator 603 begins to rise. When the voltage at the non-inverting input terminal of the third comparator 603 rises above the reference voltage at the inverting input terminal, the short-circuit signal OC output by the third comparator 603 turns from "0" to "1".

Figure 7:
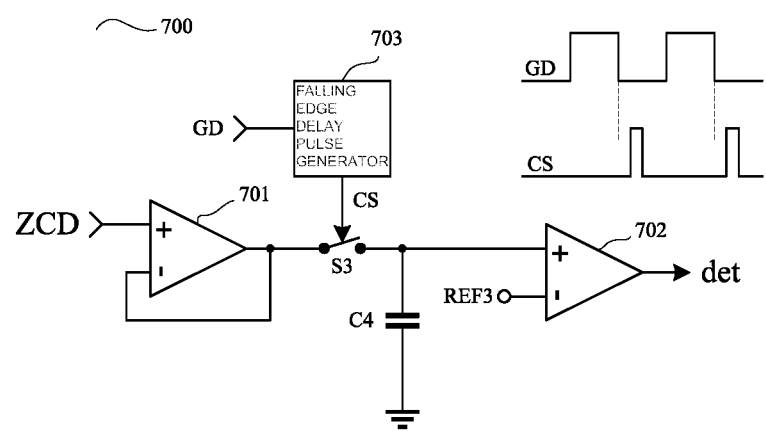
FIG. 7 illustrates a schematic of a detection module of a flyback switch-mode power supply according to one embodiment of the present invention.

FIG. 7 illustrates a short-circuit protection module 305 according to the second embodiment. The short-circuit protection module 305 includes:

a follower 701, a switch S3, a fourth capacitor C4, a fourth comparator 702 and a falling edge delay pulse generator 703. The follower 701 receives a detection voltage from terminal ZCD. The output of the follower 701 is coupled to the switch S3. The output voltage of the follower 701 follows the detection voltage at the ZCD terminal. The other terminal of the switch S3 is coupled to one terminal of the fourth capacitor C4 and the non-inverting input terminal of the fourth comparator 702. The inverting input terminal of the fourth comparator 702 is fed with a third reference voltage. The fourth comparator 702 outputs a short-circuit detection signal "det".

The switch S3 is under the control of the falling edge delay pulse generator 703. The falling edge delay pulse generator 703 receives the driving signal GD. The falling edge delay pulse generator 703 generates a sample pulse CS after a delay from the falling edge of the driving signal GD. The sample pulse CS turns off the switch S3, samples the detection voltage at the ZCD terminal and sends the sampled voltage to the non-inverting input terminal of the fourth comparator 702. When the switch S3 turns off, the fourth capacitor C4 will hold the previously sampled voltage.

When the voltage at the non-inverting input terminal of the fourth comparator 702 is higher than the voltage at the inverting input terminal, the output "det" of the fourth comparator 702 is "1". When the voltage at the non-inverting input terminal of the fourth comparator 702 is lower than the voltage at the inverting input terminal, the output "det" of the fourth comparator 702 is "0".

A switch-mode power supply control apparatus and a flyback switch-mode power supply including the control apparatus are disclosed according to the present invention. Detailed embodiments and effects of the present invention are described in conjunction with the drawings. It is appreciated that the foregoing embodiments are only illustrative. The present invention is not intended to be limiting in these respects. Any modification conceived without departing from the scope of the present invention, including replacement and modification to detailed implementation of the detection module and the timer module as well as other non-substantial replacement or modification, shall be construed as falling within the scope of the present invention.

What is claimed is:

1. A switch-mode power supply control apparatus, comprising:
   a PWM controller, configured to output a driving signal;
   a short-circuit protection module, coupled to a detection terminal which receives a zero-crossing detection voltage; wherein
   if the time that the detection voltage input to the detection terminal is lower than a first reference voltage exceeds a predetermined time period, the short-circuit protection module determines that a short-circuit abnormal situation occurs, the short-circuit protection module outputs a short-circuit signal to the PWM controller, and the driving signal output by the PWM controller becomes a turn-off signal;

if the short-circuit protection module does not detect the short-circuit abnormal situation, the PWM controller operates normally.

2. The switch-mode power supply control apparatus of claim 1, wherein the short-circuit protection module comprises:
a detection module, wherein an input terminal of the detection module is coupled to the detection terminal, and the detection module compares the detection voltage input to the detection terminal with the first reference voltage;
when the detection voltage at the detection terminal is higher than the first reference voltage, the detection module outputs a high voltage;
when the detection voltage at the detection terminal is not higher than the first reference voltage, the detection module outputs a low voltage;
a timer module, wherein an input terminal of the timer module is coupled to an output terminal of the detection module, and an output terminal of the timer module is coupled to the PWM controller;
when the detection module outputs a low voltage and the duration of the low voltage exceeds a time period predetermined by the timer module, the timer module outputs the short-circuit signal to the PWM controller.

3. The switch-mode power supply control apparatus of claim 1, wherein the detection voltage input to the detection terminal comes from a voltage at an anti-phase terminal of an auxiliary winding of a flyback switch-mode power supply controlled by the switch-mode power supply control apparatus.

4. The switch-mode power supply control apparatus of claim 1, wherein the driving signal is provided to a switch transistor in the flyback switch-mode power supply controlled by the switch-mode power supply control apparatus, and the driving signal is used to control on and off of the switch transistor.

5. A flyback switch-mode power supply, comprising:
a flyback converter, configured to convert an input AC voltage to an output DC voltage, wherein the flyback converter includes a flyback transformer, a switch transistor, an output rectifier, an output filtering capacitor, an auxiliary winding, a diode and a second capacitor;
a switch-mode power supply control apparatus, comprising a PWM controller and a short-circuit protection module, wherein
the PWM controller outputs a driving signal which is provided to the switch transistor to control on and off of the switch transistor, wherein
the PWM controller determines the ratio of on-time to off-time of the switch transistor;
the short-circuit protection module is coupled to a detection terminal, and a detection voltage input to the detection terminal comes from a voltage at an anti-phase terminal of the auxiliary winding;
if the time that the detection voltage at the detection terminal is lower than a first reference voltage exceeds a predetermined time period, the short-circuit protection module determines that an abnormal situation where the flyback switch-mode power supply is shorted has occurred, the short-circuit protection module outputs a short-circuit signal to the PWM controller, and the driving signal output by the PWM controller becomes a turn-off signal;

if the short-circuit protection module does not detect the short-circuit abnormal situation, the PWM controller operates normally.

6. The flyback switch-mode power supply of claim 5, wherein the short-circuit protection module comprises:
a detection module, wherein an input terminal of the detection module is coupled to the detection terminal, and the detection module compares the detection voltage input to the detection terminal with the first reference voltage;
when the detection voltage at the detection terminal is higher than the first reference voltage, the detection module outputs a high voltage;
when the detection voltage at the detection terminal is not higher than the first reference voltage, the detection module outputs a low voltage;
a timer module, wherein an input terminal of the timer module is coupled to an output terminal of the detection module, and an output terminal of the timer module is coupled to the PWM controller;
when the detection module outputs a low voltage and the duration of the low voltage exceeds a time period predetermined by the timer module, the timer module outputs the short-circuit signal to the PWM controller.

7. The flyback switch-mode power supply of claim 6, wherein
the detection module comprises a comparator, and a non-inverting input terminal of the comparator is coupled to the anti-phase terminal of the auxiliary winding and an inverting input terminal of the comparator receives the first reference voltage;
when the voltage at the non-inverting input terminal of the comparator is higher than the voltage at the inverting input terminal, the comparator outputs a high voltage;
when the voltage at the non-inverting input terminal of the comparator is lower than the voltage at the inverting input terminal, the comparator outputs a low voltage;
the timer module is a group of counters, and the group of counters comprises N frequency dividers, an inverter, and a three-input NOR gate; wherein
an output terminal QP of a first frequency divider is coupled to an input terminal CKN of a second frequency divider;
an output terminal QN of the first frequency divider is coupled to an input terminal CKP of the second frequency divider, and so on and so forth;
the driving signal output by the PWM controller acts as a gate driving signal for the switch transistor and the driving signal is coupled to an input terminal CKN of the first frequency divider and an input terminal of the inverter, and an output terminal of the inverter is coupled to an input terminal CKP of a first driver;
an output terminal QN of a $(N-2)_{th}$ frequency divider, an output terminal QN of a $(N-1)_{th}$ frequency divider and an output terminal QN of a $N_{th}$ frequency divider are coupled to input terminals of the three-input NOR gate, and the three-input NOR gate outputs the short-circuit signal;
the output of the comparator is coupled to control terminals of all the frequency dividers;
when the output of the comparator is at a high voltage level, none of the frequency dividers work and none of the counters count, and the three inputs of the three-input NOR gate are all at a high voltage level, thus the output short-circuit signal is at a low voltage level;

when the output of the comparator is at a low voltage level, the counters start to count, and after a plurality of switching periods of the driving signal when the three inputs of the three-input NOR gate are all at a low voltage level, the output short-circuit signal turns from a low voltage level to a high voltage level.

8. The flyback switch-mode power supply of claim 6, wherein
the detection module is a second comparator, wherein a non-inverting input terminal of the second comparator is coupled to the anti-phase terminal of the auxiliary winding, and the inverting input terminal of the second comparator receives the first reference voltage;
when the voltage at the non-inverting input terminal of the second comparator is higher than the voltage at the inverting input terminal, the second comparator outputs a high voltage level;
when the voltage at the non-inverting input terminal of the second comparator is lower than the voltage at the inverting input terminal, the output of second comparator outputs a low voltage level;
the timer module comprises a first current source, a second switch transistor, a third capacitor and a third comparator, wherein a first constant current source and a drain of the second switch transistor are coupled to a non-inverting input terminal of the third comparator, the other terminal of the first constant current source is coupled to a power supply terminal, a source of the second switch transistor is grounded, the non-inverting input terminal of the third comparator is coupled to the third capacitor, the other terminal of the third capacitor is grounded, an inverting input terminal of the third comparator receives a second reference voltage and the third comparator outputs the short-circuit signal;
the output of the second comparator is coupled to a gate of the second switch transistor;
when the output of the second comparator is at a high voltage level, and the second switch transistor turns on, the voltage at the non-inverting input terminal of the third comparator is zero, which is lower than the second reference voltage at the inverting input terminal, and the short-circuit signal output at the third comparator is at a low voltage level;
when the output of the second comparator is at a high voltage level, the second switch transistor turns off, and the first constant current source starts to charge the third capacitor, and the voltage at the non-inverting input terminal of the third comparator begins to rise;
when the voltage at the non-inverting input terminal of the third comparator rises above the reference voltage at the inverting input terminal, the short-circuit signal output by the third comparator turns from a low voltage level to a high voltage level.

9. The flyback switch-mode power supply of claim 6, wherein:
the detection module comprises a follower, a second switch, a fourth capacitor, a fourth comparator and a falling edge delay pulse generator, wherein the follower receives the detection voltage from the detection terminal, the output of the follower is coupled to a terminal of the second switch, the output voltage of the follower follows the detection voltage at the detection terminal, the other terminal of the second switch is coupled to a terminal of the fourth capacitor and the non-inverting input terminal of the fourth comparator, the inverting input terminal of the fourth comparator receives a third reference voltage and the fourth comparator outputs a short-circuit detection signal;
the second switch is controlled by the falling edge delay pulse generator, wherein the falling edge delay pulse generator receives the driving signal and generates a sample pulse after a delay from the falling edge of the driving signal;
the sample pulse turns off the second switch and samples the detection voltage at the detection terminal and sends the sampled voltage to the non-inverting input terminal of the fourth comparator;
when the switch turns off, the fourth capacitor holds the previously sampled voltage;
when the voltage at the non-inverting input terminal of the fourth comparator is higher than the voltage at the inverting input terminal, the fourth comparator outputs high voltage;
when the voltage at the non-inverting input terminal of the fourth comparator is lower than the voltage at the inverting input terminal, the fourth comparator outputs a low voltage.

10. The flyback switch-mode power supply of claim 6, wherein:
the detection module comprises a follower, a second switch, a fourth capacitor, a fourth comparator and a falling edge delay pulse generator, wherein the follower receives the detection voltage from the detection terminal, the output of the follower is coupled to a terminal of the second switch, the output voltage of the follower follows the detection voltage at the detection terminal, the other terminal of the second switch is coupled to a terminal of the fourth capacitor and the non-inverting input terminal of the fourth comparator, the inverting input terminal of the fourth comparator receives a third reference voltage and the fourth comparator outputs a short-circuit detection signal;
the second switch is controlled by the falling edge delay pulse generator, wherein the falling edge delay pulse generator receives the driving signal and generates a sample pulse after a delay from the falling edge of the driving signal;
the sample pulse turns off the second switch and samples the detection voltage at the detection terminal and sends the sampled voltage to the non-inverting input terminal of the fourth comparator;
when the switch turns off, the fourth capacitor holds the previously sampled voltage;
when the voltage at the non-inverting input terminal of the fourth comparator is higher than the voltage at the inverting input terminal, the fourth comparator outputs high voltage;
when the voltage at the non-inverting input terminal of the fourth comparator is lower than the voltage at the inverting input terminal, the fourth comparator outputs a low voltage;
the timer module coin rises a first current source, a second switch transistor, a third capacitor and a third comparator, wherein a first constant current source and a drain of the second switch transistor are coupled to a non-inverting input terminal of the third comparator, the other terminal of the first constant current source is coupled to a power supply terminal, a source of the second switch transistor is grounded, the non-inverting input terminal of the third comparator is coupled to the third capacitor, the other terminal of the third capacitor is grounded, an inverting input terminal of the third comparator receives a second reference voltage and the third comparator outputs the short-circuit signal;

the output of the second comparator is coupled to a gate of the second switch transistor; when the output of the second comparator is at a high voltage level, and the second switch transistor turns on, the voltage at the non-inverting input terminal of the third comparator is zero, which is lower than the second reference voltage at the inverting input terminal, and the short-circuit signal output at the third comparator is at a low voltage level; when the output of the second comparator is at a high voltage level, the second switch transistor turns off, and the first constant current source starts to charge the third capacitor, and the voltage at the non-inverting input terminal of the third comparator begins to rise; when the voltage at the non-inverting input terminal of the third comparator rises above the reference voltage at the inverting input terminal, the short-circuit signal output by the third comparator turns from a low voltage level to a high voltage level.

* * * * *